US008520192B2

(12) United States Patent
Goering

(10) Patent No.: US 8,520,192 B2

(45) Date of Patent: Aug. 27, 2013

(54) DISTANCE-MEASURING SYSTEM

(75) Inventor: Hermann Goering, Jena (DE)

(73) Assignee: TRIMBLE Jena GmbH, Jena (DE)

( * ) Notice: Subject to any disclaimer, the term of this patent is extended or adjusted under 35 U.S.C. 154(b) by 94 days.

(21) Appl. No.: 13/030,758

(22) Filed: Feb. 18, 2011

(65) Prior Publication Data

US 2012/0092642 A1 Apr. 19, 2012

Related U.S. Application Data

(63) Continuation of application No. PCT/EP2008/006864, filed on Aug. 20, 2008.

(51) Int. Cl.
*G01C 3/08* (2006.01)

(52) U.S. Cl.
USPC .......... 356/5.01; 356/3.01; 356/4.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 4,113,381 A | 9/1978 | Epstein |
| 4,498,764 A | 2/1985 | Bölkow et al. |
| 4,699,508 A * | 10/1987 | Bolkow et al. ............... 356/5.07 |
| 5,241,360 A | 8/1993 | Key et al. |
| 5,815,251 A | 9/1998 | Ehbets et al. |
| 6,226,076 B1 | 5/2001 | Yoshida |
| 6,765,653 B2 | 7/2004 | Shirai et al. |
| 2004/0246461 A1 | 12/2004 | Ohtomo et al. |
| 2008/0297759 A1 | 12/2008 | Skultety-Betz et al. |

FOREIGN PATENT DOCUMENTS

| | | |
|---|---|---|
| EP | 1 054 267 A2 | 11/2000 |
| WO | WO 99/13293 A1 | 3/1999 |
| WO | WO 2005/111541 A1 | 11/2005 |

OTHER PUBLICATIONS

Leica Geosystems AG, "Leica TPS1200+: A Telescope with New Opto-Mecahnical Design," [White Paper]; Leica Geosystems AG, Heerbrugg Switzerland, 2007, 8 pages total.

International Search Report and Written Opinion of PCT Application No. PCT/EP2008/006864, mailed Jun. 12, 2009, 14 pages total.

* cited by examiner

*Primary Examiner* — Luke Ratcliffe

(74) *Attorney, Agent, or Firm* — Kilpatrick Townsend & Stockton LLP

(57) ABSTRACT

A distance-measuring system includes a light source, a light detector, and measuring optics for projecting light emitted by the light source to a target and for guiding light reflected from said target towards the light detector. The distance-measuring system also includes reference optics for guiding light emitted by the light source within the system towards the light detector as internal reference light and a variable attenuator for adjusting intensity of light incident on the light detector. The variable attenuator includes an attenuating filter arranged in a beam path between the measuring optics and the light detector and an actuator coupled to the attenuating filter for moving the attenuating filter. The distance-measuring system further includes an optical selector coupled to at least one of the actuator or the attenuating filter and moved by the actuator together with the attenuating filter.

13 Claims, 13 Drawing Sheets

6a
6b
6
6d
M
M'
4a
4
4b
4c
7a
7b
5c
5b*
3f
5a
3e 6b
7a
7b
7*
6
6d
M
M'
4a
4
4b
4c
6a
5c
5b*
3f
5a
3e

DISTANCE-MEASURING SYSTEM

CROSS-REFERENCES TO RELATED APPLICATIONS

This application claims priority to and is a continuation of International Patent Application No. PCT/EP2008/006864, filed on Aug. 20, 2008, the disclosure of which is hereby incorporated by reference in its entirety for all purposes.

BACKGROUND OF THE INVENTION

The present invention relates to a distance-measuring system capable of measuring a distance of a target from the system in an optical way, and, more particularly, to a compact, lightweight and cheap structure of such a system.

For determining the distance of a target from the distance-measuring system a variety of technologies are available. These technologies usually involve emitting some type of radiation (e.g. light, supersonic and radar) towards the target and receiving a portion of the radiation reflected back from the target. The distance from the system to the target is determined by one of several approaches well known by the skilled person; detailed description is therefore omitted. Some examples are described in prior art documents U.S. Pat. No. 4,113,381, U.S. Pat. No. 5,241,360, U.S. Pat. No. 6,765,653 or US 2004/0246461. For example, some systems calculate the distance from the system to the target by determining a phase difference between radiation emitted to the target and reflected radiation received from the target, while other systems measure a time delay between emission of the radiation to the target and receipt of the reflected radiation at the system. For example, measurement of distance can be accomplished by emitting a modulated microwave or infrared carrier signal to the target that is reflected by the target. The distance can then be determined, for example, by emitting and receiving multiple frequencies, and determining the integer number of wavelengths to the target for each frequency.

Such systems according to the above prior art, which use light as radiation, usually comprise a light source, a light detector and measuring optics for projecting light emitted by the light source to the target and for guiding light reflected from the target back towards the light detector.

The target can be a so-called non-cooperative target having comparatively low reflectivity (e.g. a wall of a building, a stone, a tree, or other environmental object), or a so-called cooperative target having comparatively high reflectivity (e.g. a prism or reflector). To adapt the light detector to varying intensities of reflected light that is received from different targets, the system often further comprises a variable attenuator for adjusting the intensity of light incident on the light detector.

BRIEF SUMMARY OF THE INVENTION

Embodiments of the invention are directed to a distance-measuring system having an especially compact and lightweight structure that can be manufactured at low cost while maintaining a high degree of accuracy. Further embodiments of the invention are directed to a distance-measuring system and method providing an increased measuring speed.

According to embodiments, a distance-measuring system comprises a light source, a light detector, measuring optics and a variable attenuator. According to embodiments, the distance-measuring system further comprises reference optics and an optical selector.

The light source can be, for example, a laser or Light Emitting Diode (LED) for emitting visible light or infrared light. The light can be, for example, pulse modulated, or modulated and especially comprise a carrier signal.

The light detector can be any light sensitive element capable of sensing light, especially, a semiconductor element. The light detector can be, for example, a photodiode and especially an avalanche photodiode.

The measuring optics is configured to project light emitted by the light source to a target to be measured and to direct light reflected from the target towards the light detector.

The reference optics is configured to direct light emitted by the light source within the system towards the light detector as an internal reference light. Thus, the internal reference light directed by the reference optics travels a predetermined distance from the light source to the light detector without leaving the system. This internal reference light is used to calibrate measurement of the system and thus to increase accuracy of the system.

The measuring optics and reference optics, for example, can each comprise several optical lenses, deflecting elements, filters and optical fibers.

The variable attenuator comprises an attenuating filter arranged in a beam path between the measuring optics and the light detector, a carrier supporting the attenuating filter, and an actuator coupled to the carrier for moving the carrier together with the attenuating filter. Thus, the variable attenuator is configured to adjust the intensity of light incident on the light detector. The attenuating filter can for example be a density filter and especially a neutral density filter and further especially a grey-wedge filter. Furthermore, it is emphasized that the carrier and the attenuating filter of the variable attenuator for example can either be separate elements or be made in one piece.

The optical selector is configured to selectively direct light directed by either the measuring optics or the reference optics to the light detector.

According to a first embodiment, the optical selector is coupled to at least one of the actuator and the attenuating filter, and thus moved by the actuator together with the attenuating filter. According to embodiments, the optical selector is supported by the carrier of the variable attenuator together with the attenuating filter and moved by the actuator together with the carrier. Thus, one single actuator (e.g. motor) is sufficient to move both the attenuating filter of the variable attenuator and the optical selector. As a separate actuator for the optical selector can be avoided, the system has an especially compact and lightweight structure and low manufacturing cost.

According to a second embodiment (that can be combined with the above first embodiment), the attenuating filter of the variable attenuator has first and second sections of varying transmissivity along the same direction of movement caused by the actuator. Thus, along the direction of movement of the attenuating filter, the first and second sections are arranged in succession. Transmissivity varies in each the first and second section either from higher transparency to lower transparency or from lower transparency to higher transparency. In other words, along the same direction of movement of the attenuating filter caused by the actuator, transparency of the attenuating filter has at least two maximum values and at least two minimum values. Use of the attenuating filter having at least two sections of varying transmissivity has the advantage that one of these sections can be used for measurement of non-cooperative targets and the other section can be used for measurement of cooperative targets.

According to embodiments, a maximum value of transparency of the first section of the attenuating filter of the variable attenuator is arranged neighboring in sequence to a minimum value of transparency of the second section of the attenuating filter, and a minimum value of transparency of the first section is arranged neighboring in sequence to a maximum value of transparency of the second section. For example, the first and second sections can be part of an endless loop (which endless loop can be interrupted by the selector, for example). If measurement is started with a positioning of the attenuating filter such that the beam path between the measuring optics and the light detector is arranged between the two sections of the attenuating filter, both the maximum value of transparency (that is favorable for starting measurement of non-cooperative targets) and the minimum value of transparency (that is favorable for starting measurement of cooperative targets) can be reached very quickly by moving the attenuating filter by only a small amount. Consequently, the time necessary for performing a measurement is significantly decreased. Furthermore, use of a slower actuator for moving the variable attenuator is possible, thus reducing manufacturing costs.

According to embodiments, the optical selector is arranged between the first and second sections of the attenuating filter of the variable attenuator. If measurement is started with a positioning of the attenuating filter such that the beam path between the measuring optics and the light detector is arranged where the two sections of the attenuating filter neighbor each other, the optical selector interrupts the beam path between the measuring optics and the light detector and can be arranged in a beam path between the reference optics and the light detector when measurement is started. Therefore, the optical selector can selectively direct internal reference light received from the reference optics towards the light detector when measurement is started. From this starting position a suitable attenuation of the attenuating filter can also be reached during measurement for both cooperative and non-cooperative targets very quickly. Thus, calibration of the system can be performed at the beginning of each measurement without causing a significant time delay.

According to embodiments, the attenuating filter of the variable attenuator defines the surface of a flat disc, wherein the two sections of varying transmissivity form sectors of the disc. The optical selector is arranged at a position of the disc where a minimum value of transparency of one section of varying transmissivity is arranged neighboring in sequence to a maximum value of transparency of another section of varying transmissivity of the attenuating filter. The attenuating filter can, for example, be directly mounted to the optical selector. Alternatively, a carrier of the variable attenuator can, for example, be provided for mounting the optical selector. The carrier and the attenuating filter of the variable attenuator can also be formed in one piece, for example, by providing the disc with a central shaft.

According to a third embodiment (that can be combined with at least one of the above first and second embodiments), the carrier of the variable attenuator has a circular shape rotatable about a central rotational shaft. The rotational shaft is coupled to the actuator for rotating the carrier. The circular shape can, for example, be the shape of a disc or wheel. Further, the attenuating filter of the variable attenuator is part of a circumferential surface when supported by the carrier. Examples of such circumferential surfaces are a cylinder-surface, a frusto-conical surface, or a peripheral surface of an annular ring. Variations or combinations of the above types of surfaces are possible. Furthermore, the present invention is not limited to the listed examples of circumferential surfaces. For example, the attenuating filter of the variable attenuator can be part of a surface of revolution, such as e.g. a lateral surface of a rotational solid.

Use of an attenuating filter defining a circumferential surface when supported by the carrier has the advantage that the attenuating filter has a large extension along the same direction of movement of the carrier (and thus even the attenuating filter) caused by the actuator while a compact structure of the variable attenuator as a whole is maintained. Furthermore, the attenuating filter forms an endless loop. This endless loop needs not to be continuous, but can be interrupted by the selector, for example.

According to further embodiments, the detector is arranged within the circumferential surface defined by the attenuating filter. By arranging the detector inside this circumferential surface, the system has an especially compact structure. According to embodiments, even the actuator of the variable attenuator or further components of the distance-measuring system are arranged within this circumferential surface defined by the attenuating filter.

According to embodiments, the first and second sections of varying transmissivity of the attenuating filter extend in a circumferential direction of the circumferential surface defined by the attenuating filter. This circumferential direction corresponds to the direction of movement of the carrier (and thus also to the direction of movement of the attenuating filter) caused by the actuator.

According to embodiments, the beam path between the reference optics and the light detector enters the circumferential surface defined by the attenuating filter in an area closer to the carrier of the variable attenuator than the beam path between the measuring optics and the light detector.

According to further embodiments the optical selector causes parallel displacement of beams entering and leaving the optical selector. Alternatively, or additionally, the optical selector is configured such that light incident on the optical selector, and light emitted by the optical selector is oriented orthogonal to a direction of movement of the optical selector when the actuator moves the carrier and thus also the selector.

According to embodiments, the optical selector has first and second mirror surfaces, the first mirror surface can be arranged in an optical axis defined by the reference optics, and the second mirror surface can be arranged at the same time in an optical axis defined by the detector. Position of the first and second mirror surfaces can be changed by moving the optical selector together with the variable attenuator by using the actuator. In this respect, the optical selector can be a prism, especially a rhomboid prism, for example. In this case it has some advantages if the prism is oriented such that a beam path between the first and second mirror surfaces of the prism is oriented parallel to an axis of rotation of a rotational shaft of the carrier. Alternatively, or additionally, the beam path between the first and second mirror surfaces of the prism can be, for example, oriented orthogonal to the carrier of the variable attenuator.

According to further embodiments, the system further comprises a second light source for emitting an adjustment light that can be directed through the measuring optics. The second light source can be, for example, a lamp, a bulb, a laser or Light Emitting Diode (LED) for emitting visible light. By use of such a second light source, adjustment of the measuring optics can be performed in an especially easy way as the measurement optics can be illuminated from a position close to the light detector from inside the system. Thus, the light emitted by the second light source passes trough the measuring optics in a direction opposite to the direction that is used when distance measurement of the target is performed.

According to embodiments, the optical selector comprises an external reflecting surface for directing the adjustment light towards the measuring optics. Thus, the optical selector can not only be used to selectively direct light directed by either the measuring optics or the reference optics to the light detector, but even to selectively direct light emitted by the second light source to the measuring optics.

According to embodiments, a ball lens arranged adjacent the light detector is further provided. According to further embodiments, the measuring optics comprises an optical fiber and a ball lens arranged adjacent to the optical fiber, wherein the attenuating filter can be arranged between the ball lens of the measuring optics and the ball lens of the light detector by operating the variable attenuator. Use of ball lenses before and after the attenuating filter of the variable attenuator with respect to a beam path passing through the attenuating filter has the advantage that the beams of light passing through the attenuating filter are oriented substantially parallel. Furthermore, ball lenses frequently need no calibration as ball lenses can be self-setting e.g., by using lens holders having only four points of support. Moreover, ball lenses are comparatively cheap, thus further reducing manufacturing costs. However, other lenses than ball lenses can, for example, be used in all embodiments.

According to embodiments, the reference optics comprises an optical fiber coupled to the light source, and the optical selector can be arranged between the optical fiber of the reference optics and the ball lens adjacent the light detector by operating the variable attenuator. According to embodiments, the reference optics further comprises a ball lens arranged adjacent to the optical fiber and the optical selector can be arranged between the ball lens of the reference optics and the ball lens adjacent the light detector by operating the variable attenuator. However use of a ball lens with the reference optics is optional. For example, an aperture can be provided instead of the ball lens while still achieving a satisfying functionality as the internal reference light usually has a sufficient intensity.

According to embodiments, the system further comprises a photo interrupter for detecting presence and absence of a position pin provided at the carrier of the variable attenuator, wherein the position pin and the photo interrupter are arranged such that the presence of the position pin indicates that the optical selector mounted to the variable attenuator is arranged in the beam path between the reference optics and the light detector. According to an alternative embodiment, absence of the position pin indicates that the optical selector is arranged in the beam path between the reference optics and the light detector. By use of such a photo interrupter a starting position of the variable attenuator can be found with high accuracy and at low costs. According to alternative embodiments, the position pin is formed in one piece with either the selector or the attenuating filter.

According to a further embodiment, a method of operating a distance-measuring system is provided, the method comprising taking a decision on a kind of target reflecting light towards the distance-measuring system, the kind of target comprising at least a target having low reflectivity and a target having high reflectivity, and adjusting transparency of an attenuating filter of the distance-measuring system in dependency on intensity of light received via the attenuating filter at a light detector of the distance-measuring system. Adjustment of transparency of the attenuating filter is started with the highest transparency of the attenuating filter if the kind of target identifies use of a target having low reflectivity. Furthermore, adjustment of transparency of the attenuating filter is started with the lowest transparency of the attenuating filter if the kind of target identifies use of a target having high reflectivity. In this way, an attenuation of the attenuating filter that is well adjusted to a respective kind target can be reached very quickly.

According to embodiments, the method further comprises the steps of identifying the kind of target to be used, directing light generated by the internal light source to the target to be measured, and receiving light reflected by the target at the light detector via the attenuating filter.

According to embodiments, transparency of the attenuating filter is gradually reduced during adjustment of transparency of the attenuating filter if the kind of target identifies use of a target having low reflectivity. Furthermore, transparency of the attenuating filter is gradually increased during adjustment of transparency of the attenuating filter if the kind of target identifies use of a target having high reflectivity.

According to embodiments, the kind of target to be used is determined by receiving a user input identifying a type of measurement to be performed. This input by a user comprises identification whether a cooperative target or non-cooperative target is to be used. According to an alternative embodiment, it is determined automatically whether a cooperative target or non-cooperative target is to be used, e.g. based on an intensity of light received from the target.

According to embodiments, the above method further comprises for example one or plural additional steps such as a step of calibrating a light detector by directly guiding light from the internal light source towards the light detector and detecting a phase difference between the light emitted by the light source and the light received by the light detector, or a step of detecting a phase difference between light directed to the target and reflected light received from the target to calculate a relative distance of the target.

Using the above-described distance measuring system, for example, can perform the above method.

According to a further embodiment, a surveying instrument comprising a housing and a mount supporting the housing is provided, wherein the housing comprises the above described distance-measuring system. According to embodiments, the surveying instrument further has a user interface for input of at least one of a type of measurement to be performed or a kind of target to be used by a user. The mount can for example be a tripod. The surveying instrument can for example be an electronic distance meter.

According to embodiments a distance-measuring system comprises a light source, a light detector, measuring optics, reference optics, a variable attenuator and an optical selector. The measuring optics are configured to project light emitted by the light source to a target to be measured and for guiding light reflected from said target towards the light detector. The reference optics are configured to direct light emitted by the light source within the system towards the light detector as internal reference light. The variable attenuator is configured to adjust intensity of light incident on the light detector and comprises an attenuating filter arranged in the beam path between the measuring optics and the light detector, and an actuator coupled to the attenuating filter for moving the attenuating filter. The optical selector is configured to selectively direct light guided by either the measuring optics or the reference optics to the light detector. According to embodiments, the optical selector is coupled to at least one of the actuator and the attenuating filter, and moved by the actuator together with the attenuating filter. According to embodiments, along the same direction of movement of the attenuating filter caused by the actuator the attenuating filter has first and second sections of varying transmissivity, a first section in which the transmissivity varies from higher transparency to lower transparency and a second section in which the transmissivity varies from higher transparency to lower transparency. According to embodiments, the variable attenuator further comprises a carrier supporting both the attenuating filter and the optical selector, wherein the carrier has a circular shape rotatable about a rotational shaft, and wherein the attenuating filter is part of a circumferential surface when supported by the carrier.

BRIEF DESCRIPTION OF THE DRAWINGS

The forgoing, as well as other advantageous features, will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF THE INVENTION

Figure 1:
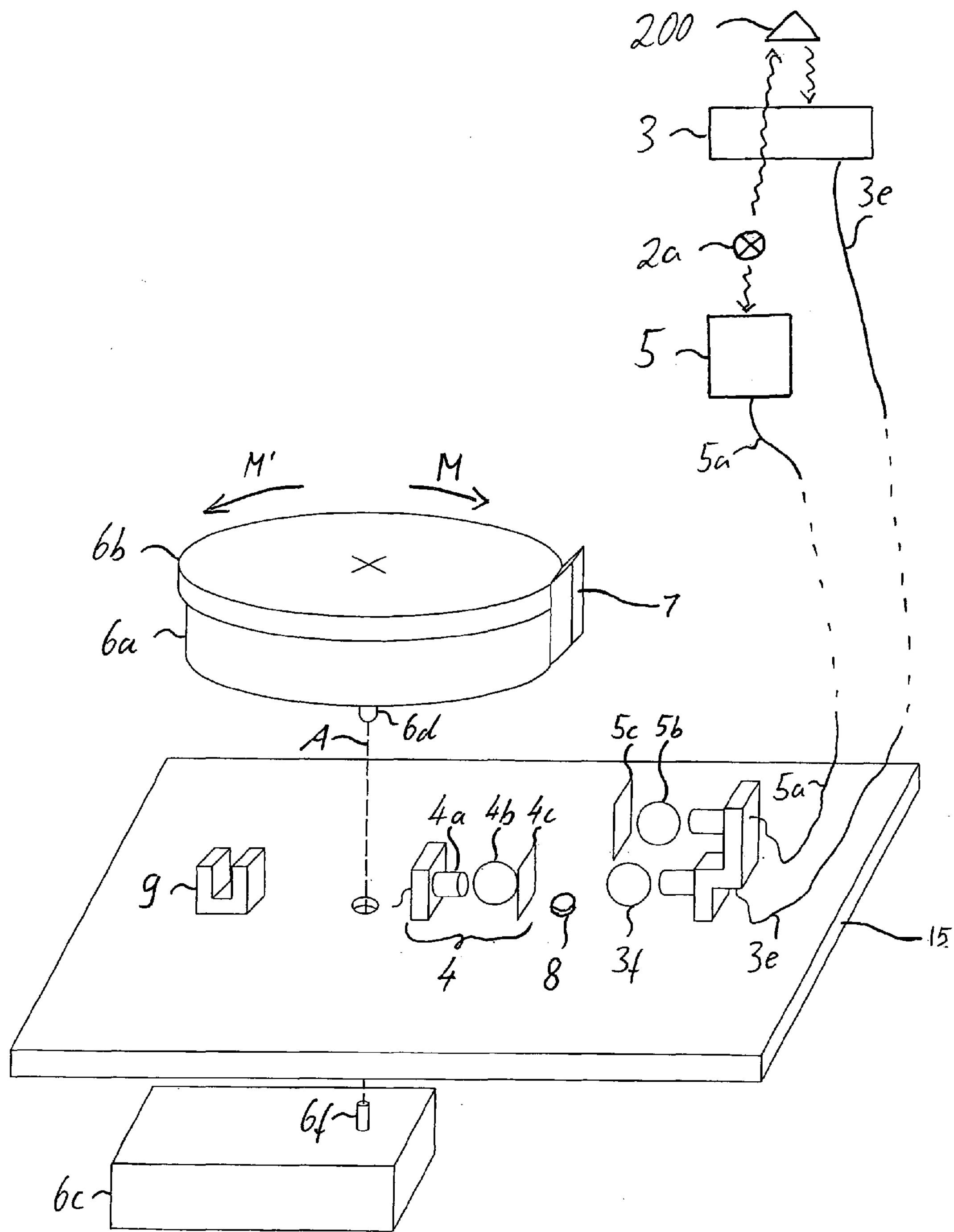
FIG. 1 shows a schematic partially exploded view of a distance measuring system according to a first embodiment.

In the exemplary embodiments described below, elements that are alike in function and structure are designated, as far as possible, by alike reference numerals. Therefore, to understand the features of the individual components of a specific embodiment, the descriptions of other embodiments and of the summary of the invention should be referred to.

In the drawings, elements that are functionally closely related to one another or are part of a generic unit are identified by the same numeral but distinguished by different characters. For example, in embodiments reference numerals 6*a* to 6*g* identify different elements of a variable attenuator 6, etc. Elements of different embodiments that are alike in function and structure but differ from one another are distinguished by asterisks.

A) First Embodiment

FIGS. 1, 1A-1E

Figure 1A:
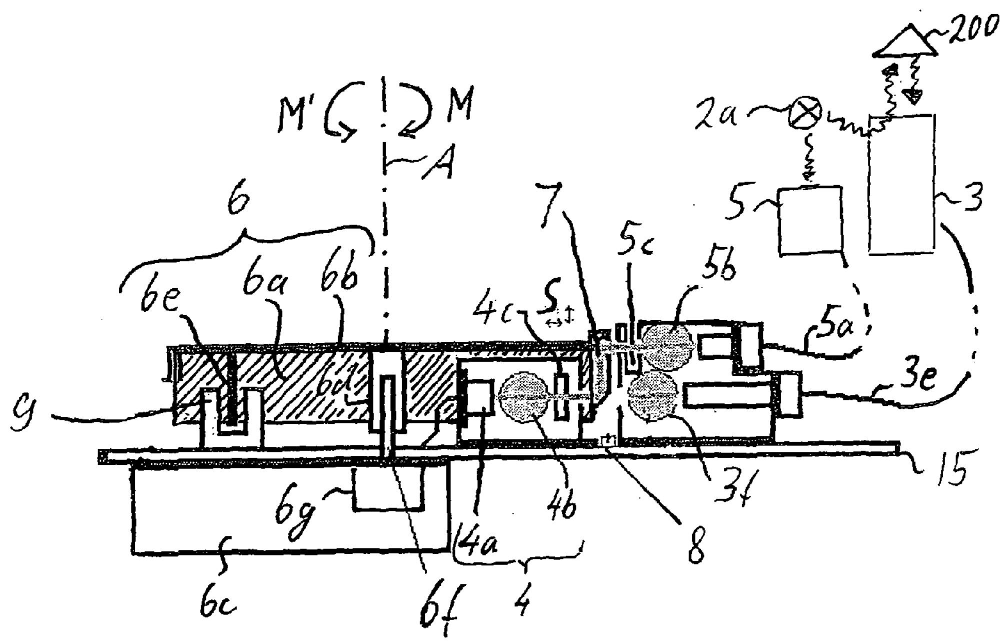
FIG. 1A shows a schematic cross sectional view of the distance measuring system according to the first embodiment.

FIGS. 1 and 1A to 1E schematically show different views of a distance measuring system according to a first embodiment in three different operating states. While FIGS. 1 and 1A schematically show the whole system, FIGS. 1B to 1E show selected elements thereof.

Figure 1B:
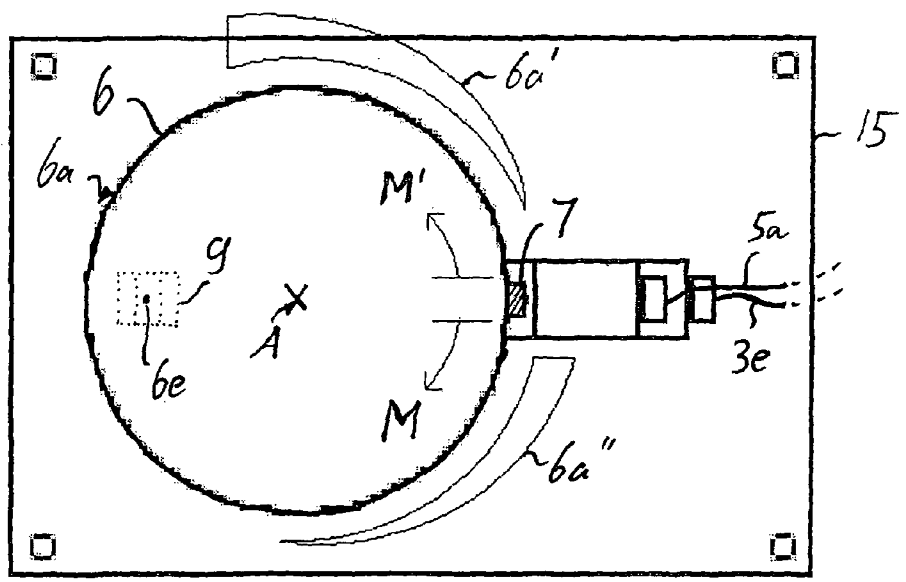
FIG. 1B shows a top view on selected elements of FIG. 1A.

FIG. 1 shows a schematic partially exploded view. FIGS. 1A, 1C, 1D and 1E each show schematic cross sectional views. FIG. 1B schematically shows a top view. In FIGS. 1 and 1A some elements are also drawn as symbols.

A1) Operating States Used in the First Embodiment

The different operating states are:

A11) A first operating state of calibrating a light detector 4*a* of a light receiver 4 of the distance measuring system by directly guiding light from an internal light source 2*a* via reference optics 5 towards the light detector 4*a*. This first operating state is shown in FIGS. 1, 1A, 1B and 1C.

A12) A second operating state of performing distance measurement with respect to a target 200 by directing light emitted by the internal light source 2*a* and reflected from the target 200 via measuring optics 3 towards the light detector 4*a* of the light receiver 4. FIG. 1D shows this second operating state.

A13) A third operating state of adjusting an optical fiber 3*e* of the measuring optics 3 by guiding adjustment light emitted by a second light source 8 towards the optical fiber 3*e* of the measuring optics 3. The third operating state is shown in FIG. 1E.

A2) General Structure of the Distance Measuring System According to the First Embodiment In the following, the general structure of the distance measuring system according to the first embodiment is described by referring to FIGS. 1 and 1A-1E.

The distance measuring system according to the first embodiment comprises a light source 2*a*, measuring optics 3, reference optics 5 and a receiving unit 15.

In the present embodiment, the light source 2*a* is a laser diode emitting light towards the measuring optics 3 and the reference optics 5. A suitable laser diode type HL6501MG is obtainable from Sasco Holz GmbH Berlin, Motardstrasse 54, 13629, Germany. However, the present invention is not restricted to use of laser diodes or laser light sources. Any other light source, e.g., a Light Emitting Diode for emitting visible light or infrared light, might be used. The light emitted by the light source can for example be modulated and especially comprise a carrier signal. However, even pulse modulated light can be used.

In the present embodiment, the measuring optics 3 project light emitted by the light source 2*a* to a target 200, the distance of which target 200 relative to the distance measuring system 15 is to be measured. The measuring optics 3 further direct light reflected from said target 200 towards a light detector 4*a* of the receiving unit 15.

In the present embodiment, the reference optics 5 direct light emitted by the light source 2*a* within the system towards the light detector 4*a* of the receiving unit 15 as internal reference light. Both the measuring optics 3 and the reference optics 5 will be described later in further detail by reference to FIG. 5. The measuring optics 3 and the reference optics 5 each can for example comprise several optical elements such as lenses, deflecting elements, filters and optical fibers.

In the first embodiment shown in FIG. 1A, the receiving unit 15 comprises a light receiver 4 comprising the light detector 4*a*, an optical selector 7 and a variable attenuator 6.

In the first embodiment, the light receiver 4 comprises a light detector 4*a*, a ball lens 4*b* and a filter 4*c*. The ball lens 4*b* is provided between the filter 4*c* and the light detector 4*a*. The light detector 4*a* can be any light sensitive element capable of sensing light, especially a semiconductor element. For example, the light detector can be a photodiode and especially an avalanche photodiode. A suitable light detector type AD230-8 TO52S1 is obtainable from Silicon Sensor GmbH, Ostendstrasse 1, 12459 Berlin, Germany. However, the present invention is not restricted to a light receiver 4 having the above structure. For example, ordinary lenses can be used instead of the ball lenses. Alternatively, at least one of the lens and the filter can be omitted.

In the present embodiment, the optical selector 7 is a rhomboid prism 7 having a first mirror surface 7*a* and a second mirror surface 7*b*, which cause a parallel displacement of beams of light entering and leaving the rhomboid prism 7. Thus, beams of light entering the rhomboid prism 7 and leaving the rhomboid prism 7 are substantially parallel. The first mirror-surface 7*a* can be arranged in an optical path of an optical fiber 5*a* (reference fiber) of the reference optics 5, and the second mirror surface 7*b* can be arranged at the same time in an optical path defined by the ball lens 4*b* of the light detector 4*a*. A suitable rhomboid prism can be obtained from Sinocera Photonics Inc., No. 355, PuHui Road, Jiading, Shanghai 201821, China. In the present embodiment, the rhomboid prism has the size 2 mm*2 mm*5 mm. However, the present invention is not restricted to these dimensions or the use of a rhomboid prism as optical selector 7. In the present embodiment, a housing 7*d* of the rhomboid prism 7 (beside a light incident surface and a light emerging surface located adjacent the first and second mirror surfaces 7*a*, 7*b*) is essentially opaque. Thus, in the present embodiment the housing 7*d* of the rhomboid prism 7 blocks light directed by the measuring optics 3 towards the light detector 4*a* when the distance measuring system is in the first operating state (i.e. the rhomboid prism 7 is located as shown in FIGS. 1 and 1A-1C, for example). However, light guided by the reference optics 5 can be incident on and emerge from the housing 7*d* of the rhomboid prism 7 via the light incident and emerging surfaces. In the present embodiment, the housing 7*d* is a separate element that is fixedly attached to the prism 7 and supported by the carrier 6*b* of the variable attenuator 6. However, according to an alternative embodiment a coating of the rhomboid prism (e.g. an opaque color) constitutes the housing, for example. According to a further alternative embodiment, the housing is formed in one piece with the carrier 6*b* of the variable attenuator 6. It is emphasized that the present invention is not restricted to a rhomboid prism having such a housing. In fact, the housing may even be omitted.

In the present embodiment, main components of the variable attenuator 6 are an attenuating filter 6*a*, a carrier 6*b* and an actuator 6*c*.

A neutral density filter is used as attenuating filter 6*a* in the present embodiment. According to an embodiment, a gray wedge filter is used as attenuating filter. However, the present invention is not restricted to a certain kind of attenuating filter. The attenuating filter will be described in further detail by reference to FIGS. 2A, 2B.

In the present embodiment, the carrier 6*b* is made of an opaque plastic material and has the shape of a disc. However, the present invention is not restricted to an opaque carrier 6*b* or plastic material. Moreover, the present invention is not restricted to a carrier having the shape of a disc. The carrier can for example have any circular shape and even the shape of a wheel. Further, the present invention is not restricted to a carrier having a circular shape. The carrier 6*b* is rotatable about a central rotational axis A by a rotational shaft 6*d*. The rotational shaft 6*d* is arranged in the center of the carrier 6*b* and coupled to a driving shaft 6*f* of the actuator 6*c*. The carrier 6*b* supports both the attenuating filter 6*a* and the optical selector 7. However, the carrier 6*b* and at least one of the attenuating filter 6*a* and optical selector 7 need not be separate elements but can be formed integrally in one piece, for example.

In the present embodiment, the actuator is a motor 6*c* and especially a stepper motor. The variable attenuator 6 is operated by rotating the rotational shaft 6*d* of the carrier 6*b* via the driving shaft 6*f* that is coupled to an internal gear 6*g* of the motor 6*c*. Consequently, the carrier 6*b* is rotated together with the attenuating filter 6*a* and the optical selector 7 about the rotational axis A. A suitable stepper motor can be obtained as type VID 29-05-03 from Data Instrumentation Technology Ltd, North Unit 4/f, H-2 Bld., East Industrial Park, Overseas Chinese Town, Shenzhen 518053, China. It is emphasized that the present invention is not restricted to a certain actuator or use of a stepper motor or a motor comprising an internal gear for operating the variable attenuator 6. A manual drive can for example be used as actuator instead of the motor.

As the carrier 6*b* supports both the attenuating filter 6*a* and the selector 7 at the same time, the attenuating filter 6*a* and the selector 7 are both rotated together with the carrier 6*b* about rotational axis A when the variable attenuator 6 is operated in response to operation of the motor 6*c*. Consequently, one single actuator is sufficient to displace both the attenuating filter 6*a* and the selector 7.

Figure 2A:
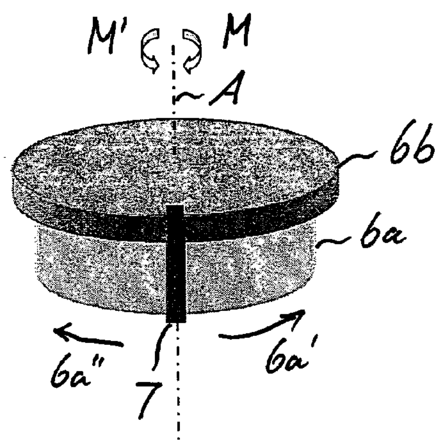
FIG. 2A schematically shows a perspective view on selected elements of a variable attenuator that is used in embodiments.
Figure 2B:
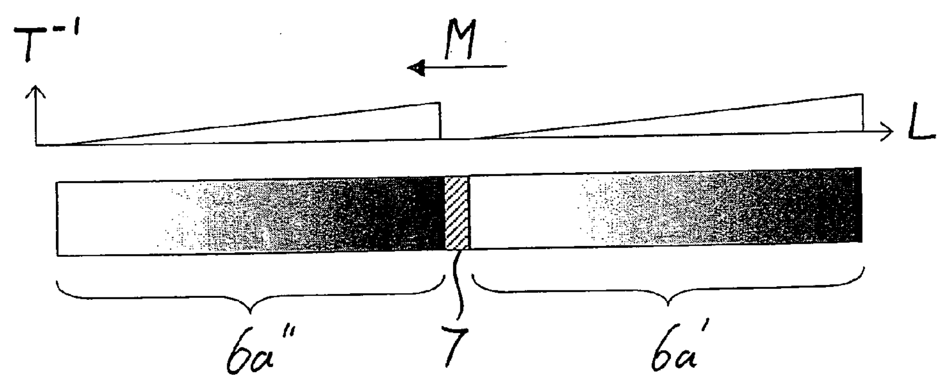
FIG. 2B schematically shows an attenuating filter and optical selector of the variable attenuator of FIG. 2A, which attenuating filter is unfolded in one plane.

Detailed Description of Attenuating Filter (FIGS. 2A, 2B)

The attenuating filter 6*a* and the carrier 6*b* supporting the same will now be explained in more detail by referring to FIGS. 2A and 2B. Afterwards description of the first embodiment will be resumed.

FIG. 2A schematically shows a perspective view of the carrier 6*b* supporting the attenuating filter 6*a* and the selector 7 used in the first and second embodiments.

The attenuating filter 6*a* is part of a circumferential cylinder-surface when supported by the carrier 6*b*. First and second sections 6*a*' and 6*a*" of the attenuating filter 6*a* extend in circumferential direction of the cylinder-surface. As can be seen from a comparison of FIGS. 1 and 1A to 1E with FIG. 2A, the attenuating filter 6*a* surrounds the light receiver 4 of the receiving unit 15 when mounted to the carrier 6*b*. This results in an especially compact structure of the receiving unit 15. In this respect it is emphasized that the present invention is not restricted to an attenuating filter defining a circumferential cylinder-surface. In fact, according to alternative embodiments the attenuating filter can for example define a frusto-conical surface or the surface of an annular ring or other circumferential surface surrounding the actuator or light receiver 4.

FIG. 2B schematically shows the attenuating filter 6*a* and selector 7 when unfolded in one plane. In FIG. 2B, the shaded areas symbolize the amount of attenuation 1/T ($T^{-1}$) and the white areas the amount of transparency T. This is further symbolized by the graph above the attenuating filter 6*a*. In this graph, the vertical y-axis indicates the amount of attenuation 1/T and the horizontal x-axis the length L of the unfolded attenuating filter 6*a*. When mounted to the carrier 6*b* as shown in FIG. 2A, the leftmost and rightmost portions of the unfolded attenuating filter 6*a* shown in FIG. 2B are joined together, thus forming an endless loop. In the present embodiment, the selector 7 is part of this endless loop.

As is shown in FIG. 2B, along the same direction of movement M of the attenuating filter 6*a* when mounted to the carrier 6*b*, the attenuating filter 6*a* has a first section 6*a*' in which the transmissivity varies from low transparency T (and thus high attenuation 1/T) to high transparency T (and thus low attenuation 1/T), and a second section 6*a*" in which the transmissivity varies from low transparency to high transparency. Such attenuating filter can be manufactured in known ways for example by photochemistry or printing technologies. However, it is emphasized that the present invention is not restricted to an attenuating filter having the characteristics shown in FIG. 2B. For example, the transmissivity alternatively can vary from high transparency to low transparency in the two sections. Moreover, the attenuating filter can for example have more or less than two sections of varying transmissivity. In the present embodiment, the selector 7 is arranged between the two sections 6*a*' and 6*a*" and thus between an area where the attenuating filter 6*a* has a highest transparency and an area where the attenuating filter 6*a* has a lowest transparency.

Description of the first embodiment is now resumed.

In the present embodiment, the varying transmissivity of the attenuating filter 6*a* is used to adapt the system to the intensity of light actually received by the light detector 4*a* of the light receiver 4. Intensity of light reflected from the target 200 and received by the light receiver 4 varies in dependency on a distance D (see FIG. 6) and kind of the target 200 (as either cooperative or non-cooperative targets can be used). Even air flickering, air humidity and the cleanliness of the air have some influence on the intensity of light received by the light receiver 4.

In the following, the function of the receiving unit 15 described above is explained in further detail.

A11) First Operating State of the First Embodiment

FIGS. 1, 1A, 1B and 1C show the first operating state. In the first operating state the selector 7 is arranged such that light emitted by the light source 2*a* is directly directed by the reference optics 5 via an optical fiber 5*a*, a ball lens 5*b*, a constant attenuating filter 5*c*, the first and second mirror surfaces 7*a*, 7*b* of the selector 7, the filter 4*c* and ball lens 4*b* towards the light detector 4*a*. By measuring intensity of light received by the light detector 4*a* calibration of the system is performed.

The constant attenuating filter 5*c* is provided after the ball lens 5*b* of the reference optics as the light emitted by the optical fiber 5*a* of the reference optics does not pass through the attenuating filter 6*a* to allow adaptation between a respective light source 2*a* and light detector 4*a*. In the present embodiment, the constant attenuating filter 5*c* adapts intensity of internal reference light directed by the reference optics 5 via the selector 7 towards the light detector 4*a* to an order of magnitude (scale) of intensity of light (reflected from the target 200) typically directed by the measuring optics 3 towards the light detector 4*a*. However, the constant attenuating filter 5*c* can even be omitted if adaptation between a respective light source 2*a* and light detector 4*a* is not necessary.

As the selector 7 causes a parallel displacement of the beams entering and leaving the selector 7, slackness S of the selector 7 occurring during rotation about the rotational shaft 6*d* of the carrier 6*b* does not deteriorate measurement accuracy.

In the first operating state light reflected from the target 200 and directed by the measuring optics 3 towards the light detector 4*a* does not reach the light detector 4*a* as it is blocked by the housing 7*d* of the selector 7.

A12) Second Operating State of the First Embodiment

The second operating state, where light reflected from the target 200 is directed by optical fiber 3*e* (receiving fiber) from measuring optics 3 through a ball lens 3*f*, the attenuating filter 6*a*, the filter 4*c* and ball lens 4*b* towards the light detector 4*a*, is shown in FIG. 1D. This operating state is the state in which the distance D of the target 200 from the system is actually measured.

Figure 1C:
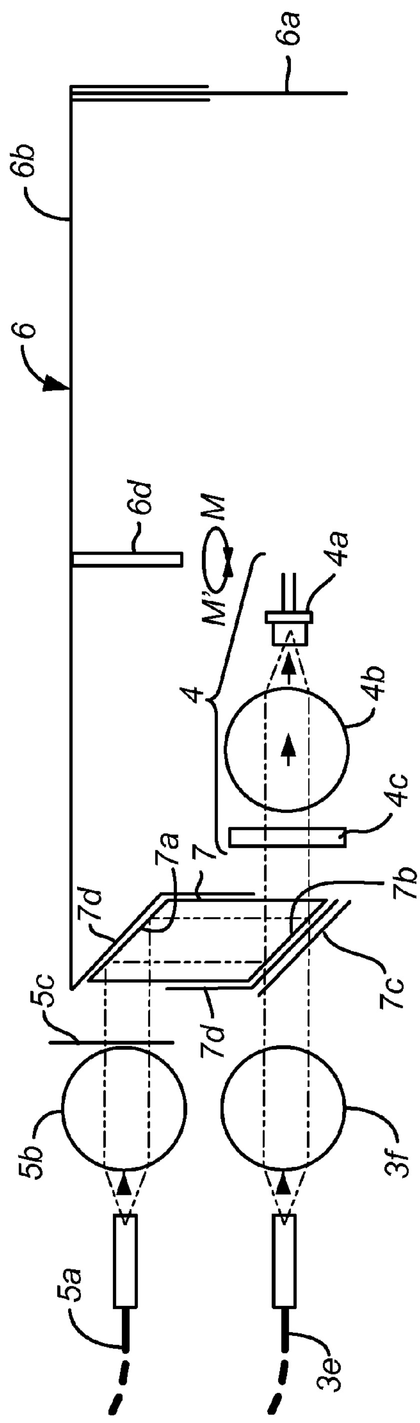
FIG. 1C shows an enlarged schematic cross sectional view of selected elements of FIG. 1A in a first operating state.
Figure 1D:
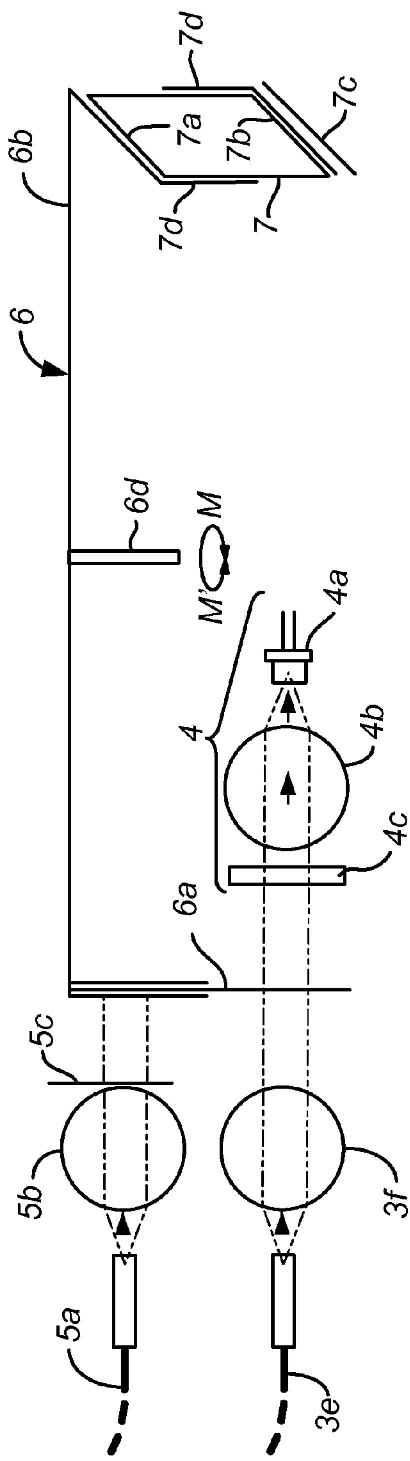
FIG. 1D shows an enlarged schematic cross sectional view of selected elements of FIG. 1A in a second operating state.
Figure 1E:
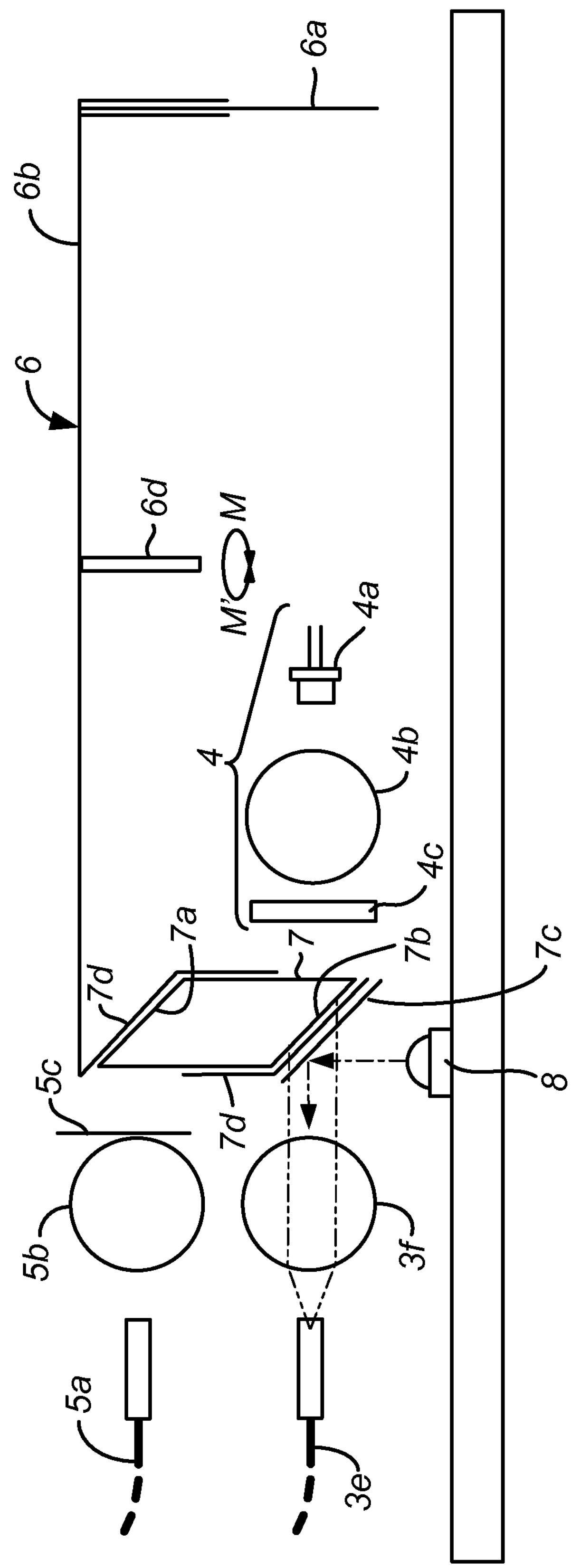
FIG. 1E shows an enlarged schematic cross sectional view of selected elements of FIG. 1A in a third operating state.

As can be seen from a comparison of FIGS. 1C and 1D, a beam path between the optical fiber 5*a* and the light detector 4*a* enters the circumferential cylinder-surface defined by the attenuating filter 6*a* in an area closer to the carrier 6*b* than a beam path between the optical fiber 3*e* and the light detector 4*a*. Thus, taking the carrier 6*b* as top of the receiving unit 15 and the light detector 4*a* as bottom of the receiving unit 15, the optical fiber 5*a* of the reference optics 5 is arranged above the optical fiber 3*e* of the measuring optics 3.

In the second operating state internal reference light directed by the reference optics 5 towards the light detector 4*a* does not reach the light detector 4*a* as it is blocked by the carrier 6*b* that is supporting both the variable attenuating filter 6*a* and the selector 7. Moreover, in the present embodiment an optical axis of the reference optics 5 is offset from an optical axis of the light receiver 4 comprising the light detector 4*a* if the selector 7 is not arranged in the optical path of the reference optics 5.

A13) Third Operating State of the First Embodiment

In the first embodiment, the system further comprises a second light source (e.g. a LED) 8 for emitting adjustment light having a wavelength that is observable by the human eye. A suitable second light source 8 is obtainable as SMD-LED type LSL29 from Sasco Holz GmbH Berlin, Motardstrasse 54, 13629, Germany. However, the present invention is not restricted to use of an LED as second light source. Any light source emitting visible light can be used, e.g. a lamp, bulb or laser.

As shown in FIG. 1E, adjustment light emitted by the second light source 8 is directed by an external mirror surface 7*c* provided on an outside of the selector 7 towards the optical fiber 3*e* (receiving fiber) if the selector 7 is in the same position as in the above described first operating state. This allows adjustment of the optical fiber 3*e* in an especially easy manner.

It is emphasized that the present invention is not restricted to a mirror surface 7*c* provided on the selector 7 to reflect light from the second light source 8 towards the optical fiber 3*e*. Alternatively, a reflecting surface other than a mirror surface and even a reflecting surface separate from the selector 7 may be used.

The second light source 8 need not be operated all the time or for each measurement, but only if adjustment of the optical fiber 3*e* of the measuring optics is to be performed. This is usually only necessary under exceptional circumstances (e.g. at manufacturing or at maintenance of the system).

In the present embodiment, in the third operating state the light source 2*a* is switched off. Thus, no internal reference light is directed by the reference optics 5 towards the light detector 4*a*. In consequence, also no light is reflected from the target 200 and directed by the measuring optics 3 towards the light detector 4*a*.

A3) Additional Features of the First Embodiment Relating to all Operating States Starting from the first operating state, calibration of the light detector 4*a* is performed by directing internal reference light to the light detector 4*a* and measuring intensity thereof. Afterwards, the motor 6*c* is controlled such that the carrier 6*b*, the attenuating filter 6*a* and the optical selector 7 are commonly rotated either in a clockwise direction M or anti-clockwise direction M' into the second operating state. When using the attenuating filter having varying transmissivity as described above with respect to FIGS. 2A and 2B, rotation in a clockwise direction is performed if a non-cooperative target is to be observed, whereas rotation in an anti-clockwise direction is performed when a cooperative target is to be observed. Thus, when a cooperative target is to be observed, the lowest transparency and thus highest degree of attenuation is used for starting measurement. On the other hand, when a non-cooperative target is to be observed, measurement is started by using a highest transparency and thus only a lowest degree of attenuation.

In the present embodiment, the ball lenses 3*f* and 5*b* are arranged neighboring the optical fibers 3*e* and 5*a* of the measuring optics 3 and the reference optics 5, respectively. Ball lens 4*f* is provided in front of the light detector 4*a*. The ball lenses 3*f*, 4*b* and 5*b* are used to provide a parallel beam of light which is favorable when the light is passing through the attenuating filter 6*a*, as shown in FIG. 1D, or the constant attenuating filter 5*c*, as shown in FIGS. 1A and 1C. Suitable ball lenses can be obtained from Sinocera Photonics Inc., No. 355, PuHui Road, Jiading, Shanghai 201821, China. In the present embodiment, the ball lenses have a diameter of 5 mm. However, the present invention is not restricted to these dimensions or the use of ball lenses.

As shown in FIGS. 1A and 1B, in the present embodiment a position pin 6*e* extending in parallel to the rotational axis A is provided on a bottom of the carrier 6*b*. A photo interrupter 9 can detect presence or absence of the position pin 6*e* at a certain position. In the embodiments, position pin 6*e* and the photo interrupter 9 are positioned such that the position pin 6*e* is detected by the photo interrupter 9 when the selector 7 is arranged in the beam path between the optical fiber 5*a* of the reference optics 5 and the light detector 4*a*. Thus, if the photo interrupter 9 detects presence of the position pin 6*e*, the system is in the first respectively third operating state described above and ready for calibration of the light detector 4*a* respectively adjustment of the receiving fiber 3*e*. The first operating state is a good starting point for measurement.

A suitable photo interrupter type CPI-210T is obtainable from Endrich Bauelemente Vertriebs GmbH, Hauptstrasse 56, 72202 Nagold, Germany. It is emphasized that use of the position pin and photo interrupter is only facultative. Alternatively, the position of the selector can, for example, be directly detected by the output of the motor, especially when the motor has a mechanical stop.

B) Second Embodiment

FIGS. 3A-3D

FIGS. 3A to 3D schematically show different views of a distance measuring system according to a second embodiment in two different operating states.

Figure 3A:
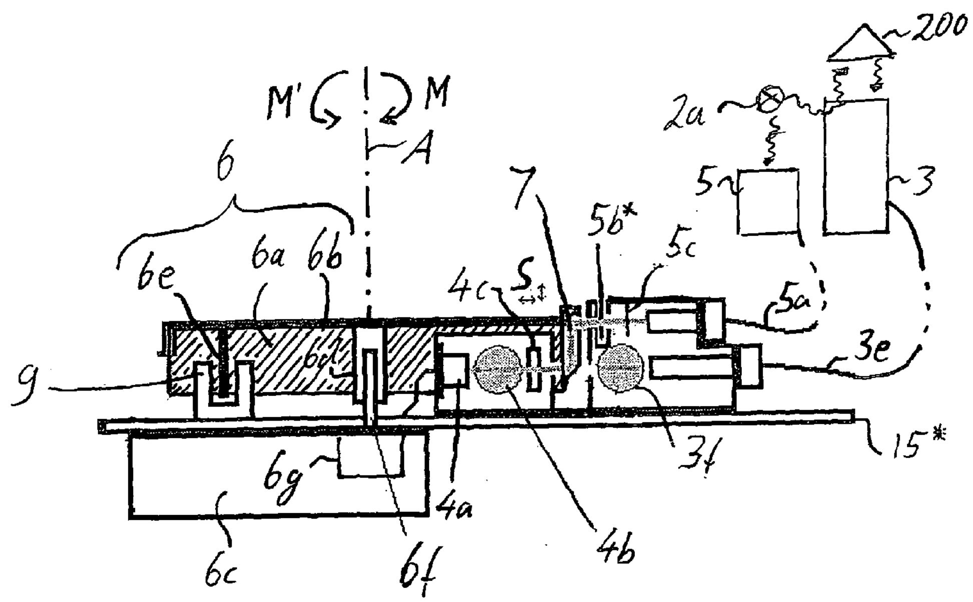
FIG. 3A shows a schematic cross sectional view of a distance measuring system according to a second embodiment.
Figure 3B:
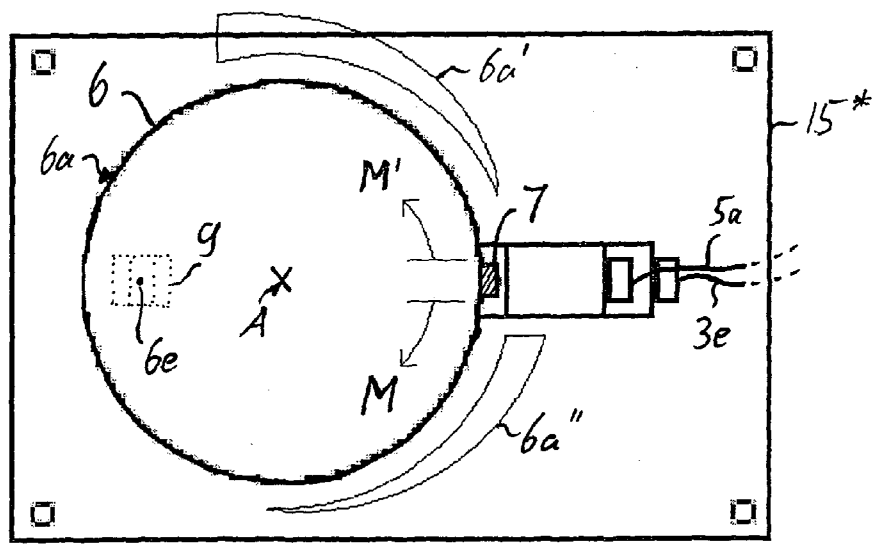
FIG. 3B shows a top view on selected elements of FIG. 3A.
Figure 3C:
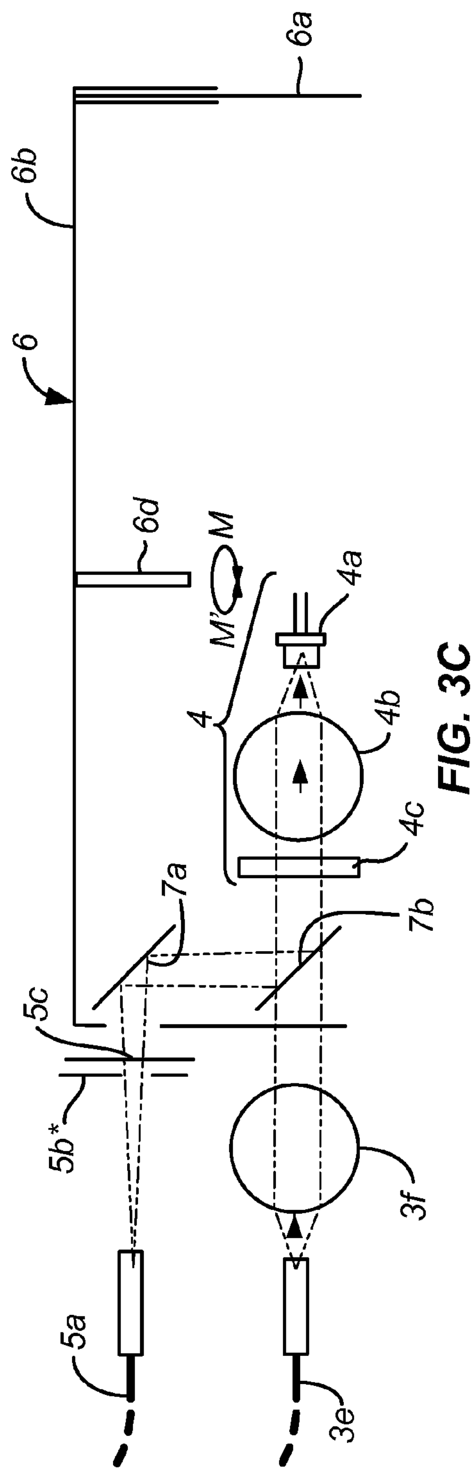
FIG. 3C shows an enlarged schematic cross sectional view of selected elements of FIG. 3A in a first operating state.
Figure 3D:
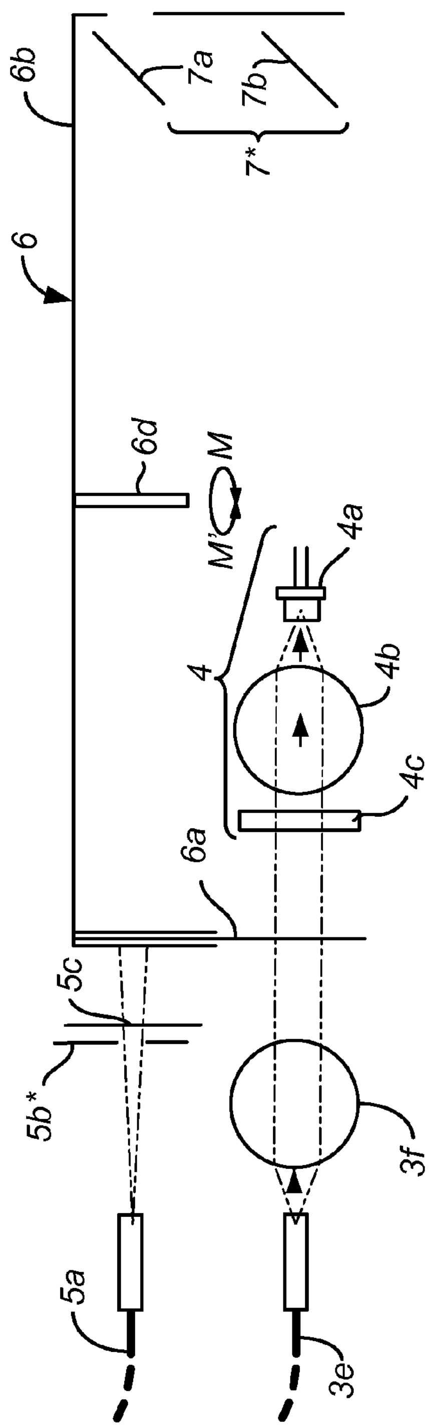
FIG. 3D shows an enlarged schematic cross sectional view of selected elements of FIG. 3A in a second operating state.

FIGS. 3A, 3C and 3D each show schematic cross sectional views. FIG. 3B schematically shows a top view.

The different operating states are the first and second operating states described above with respect to the first embodiment. The first operating state is shown in FIGS. 3A, 3B and 3C whereas the second operating state is shown in FIG. 3D.

The structure and function of the receiving unit 15* of the second embodiment is very similar to the structure and function of the receiving unit 15 of the above-described first embodiment. Therefore description of the first embodiment is referred to.

In the first operating state shown in FIGS. 3A, 3B and 3C, light emitted by the light source 2*a* is directed by the reference optics 5 and the optical selector 7* towards the light detector 4*a*. This light is received by the light detector 4*a* as internal reference light. Light reflected from the target 200 and directed by the measuring optics 3 towards the light detector 4*a* is blocked by the carrier 6*b* supporting both the attenuating filter 6*a* and the optical selector 7*.

In the second operating state shown in FIG. 3D, light reflected from the target 200 and directed by the measuring optics 3 towards the light detector 4*a* is received by the light detector 4*a* via the attenuating filter 6*a*. The internal reference light directed by the reference optics 5 towards the light detector 4*a* is blocked by the carrier 6*b* of the variable attenuator 6.

The second embodiment basically differs from the first embodiment in that the ball lens 5*b* is replaced by an optical aperture 5*b. Such optical aperture 5*b provides sufficient accuracy if the intensity of light directed by the optical fiber 5*a* of the reference optics towards the light detector 4*a* is sufficiently high.

Moreover, in the second embodiment provision of a second light source 8 and an external mirror surface at the optical selector 7* is omitted. Furthermore, the rhomboid prism that is used as optical selector 7 in the first embodiment is replaced by an optical selector 7* comprising two parallel mirror surfaces 7*a* and 7*b*.

C) Third Embodiment

FIGS. 4A-4D

Figure 4A:
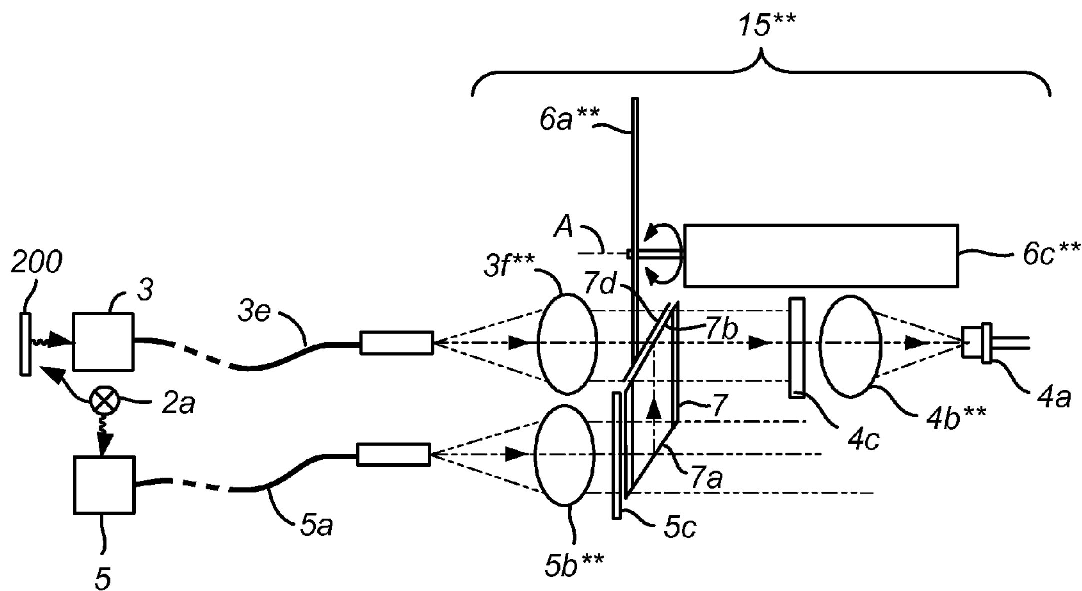
FIG. 4A shows a schematic cross sectional view of a distance measuring system according to a third embodiment in a first operating state.
Figure 4B:
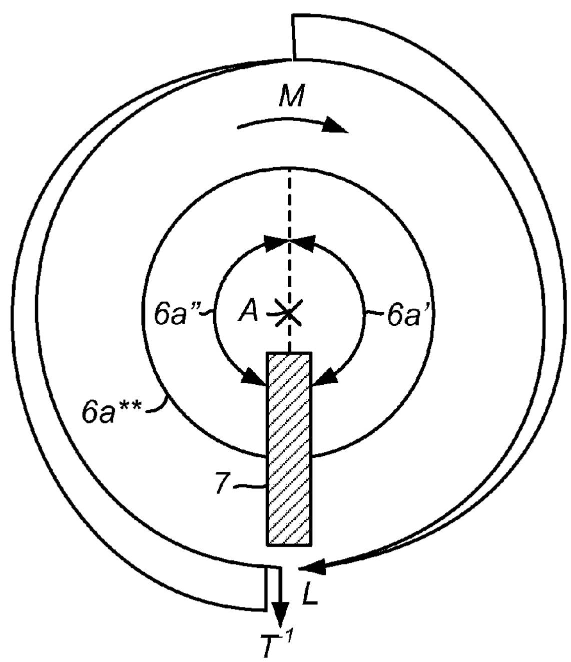
FIG. 4B schematically shows a front view of an attenuating filter and optical selector of a variable attenuator used in the embodiment of FIG. 4A in the first operating state.
Figure 4C:
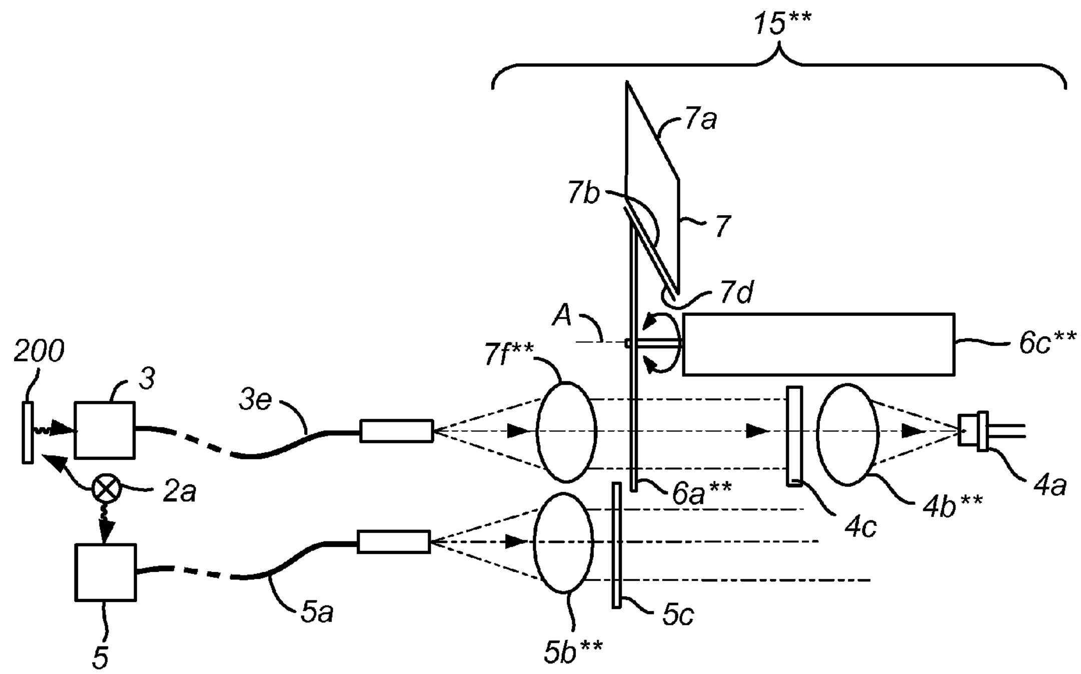
FIG. 4C shows a schematic cross sectional view of a distance measuring system of FIG. 4A in a second operating state.
Figure 4D:
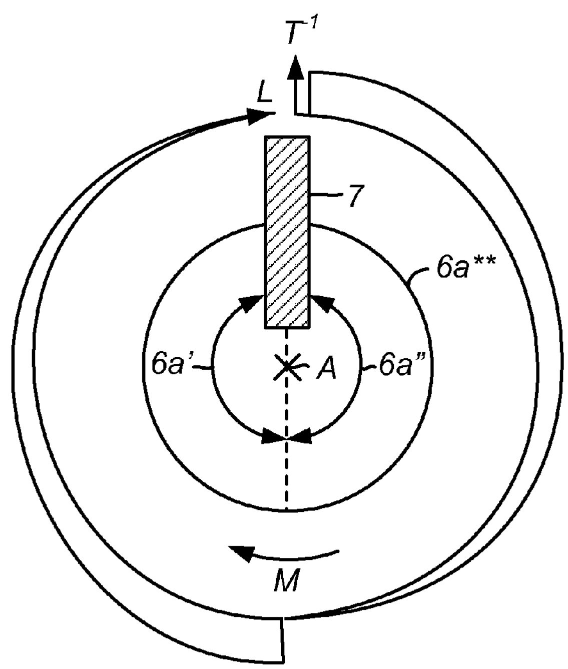
FIG. 4D schematically shows a front view of an attenuating filter and optical selector of a variable attenuator used in the embodiment of FIG. 4A in the second operating state.

FIGS. 4A and 4C schematically show cross sectional views of a distance measuring system according to a third embodiment in two different operating states. FIGS. 4B and 4D schematically show front views of an attenuating filter 6** used in the third embodiment.

The different operating states are the first and second operating states described above with respect to the first embodiment. The first operating state is shown in FIGS. 4A and 4B, and the second operating state is shown in FIGS. 4C and 4D.

The structure and function of the third embodiment is very similar to the above-described first embodiment. Therefore description of the first embodiment is referred to.

In the first operating state shown in FIGS. 4A and 4B, light emitted by the light source 2*a* is directed by the reference optics 5 and the optical selector 7 towards the light detector 4*a*. This light is received by the light detector 4*a* as internal reference light. Light reflected from the target 200 and directed by the measuring optics 3 towards the light detector 4*a* is blocked by the housing 7*d* of the optical selector 7. In the present embodiment, the housing 7*d* of the optical selector 7 is constituted by an external opaque coating layer of the second mirror surface 7*b* of the optical selector 7. To facilitate understanding FIGS. 4A and 4C, a gap is shown between elements 7*b* and 7*d* that in fact need not exist in the present embodiment. However, it is emphasized that the present invention is not restricted to such a kind of housing or an optical selector having a housing at all.

In the second operating state shown in FIGS. 4C and 4D, light reflected from the target 200 and directed by the measuring optics 3 towards the light detector 4*a* is received by the light detector 4*a* via the attenuating filter 6*a*. The internal reference light directed by the reference optics 5 towards the light detector 4*a* does not reach the light detector 4*a* as the optical axis of the reference optics 5 is offset from the optical axis of the light receiver 4 comprising the light detector 4*a*.

The third embodiment differs from the first embodiment in that the second light source 8 and an external mirror surface at the optical selector 7 are omitted.

Furthermore, in the third embodiment the carrier, attenuating filter and rotational shaft of the variable attenuator 6 are of one piece. Thus, the selector 7 is directly supported by the attenuating filter 6*a*.

According to the third embodiment, the attenuating filter 6*a* has the form of a flat disc. As symbolized by the graph in FIGS. 4B and 4D the attenuating filter 6*a* has two sections 6*a*', 6*a*" of varying transmissivity along a direction of movement M of the attenuating filter 6*a*, wherein the transmissivity varies from lower transparency to higher transparency in both the first and second sections 6***a*', 6*a*". At a portion between the two sections 6*a*', 6", the optical selector 7 is mounted.

Moreover, in the third embodiment the ball lenses are replaced by ordinary lenses 3*f*, 4*b* and 5*b*. Further, a motor 6*c* without internal gear is used as actuator for rotating the attenuating filter 6*a***.

D) Surveying Instrument

FIG. 5

Figure 5:
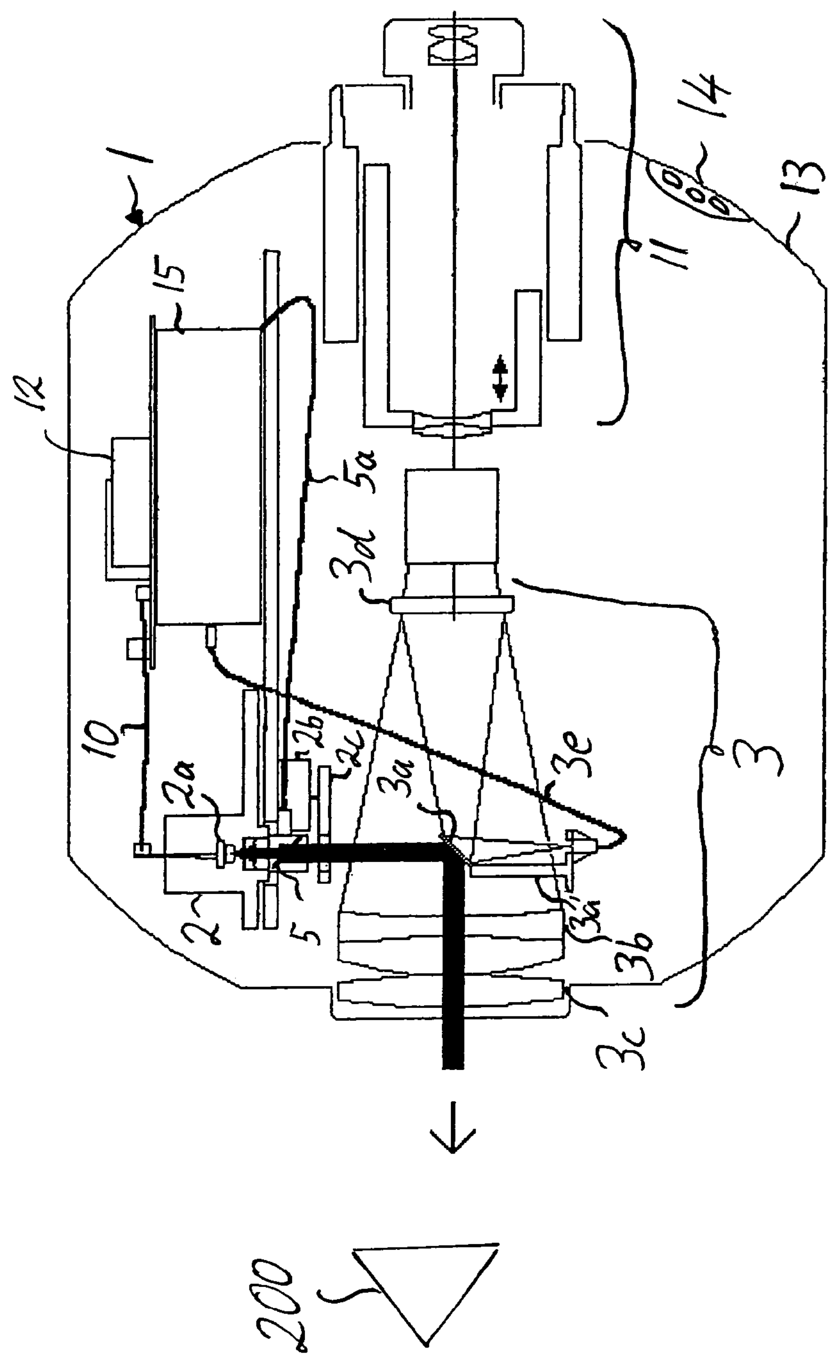
FIG. 5 is a schematic cross sectional view of a surveying instrument comprising the distance measuring system according to embodiments.

FIG. 5 is a schematic cross-sectional view of a surveying instrument (e.g. a telescope unit) comprising the distance measuring system according to the above embodiments.

Figure 6:
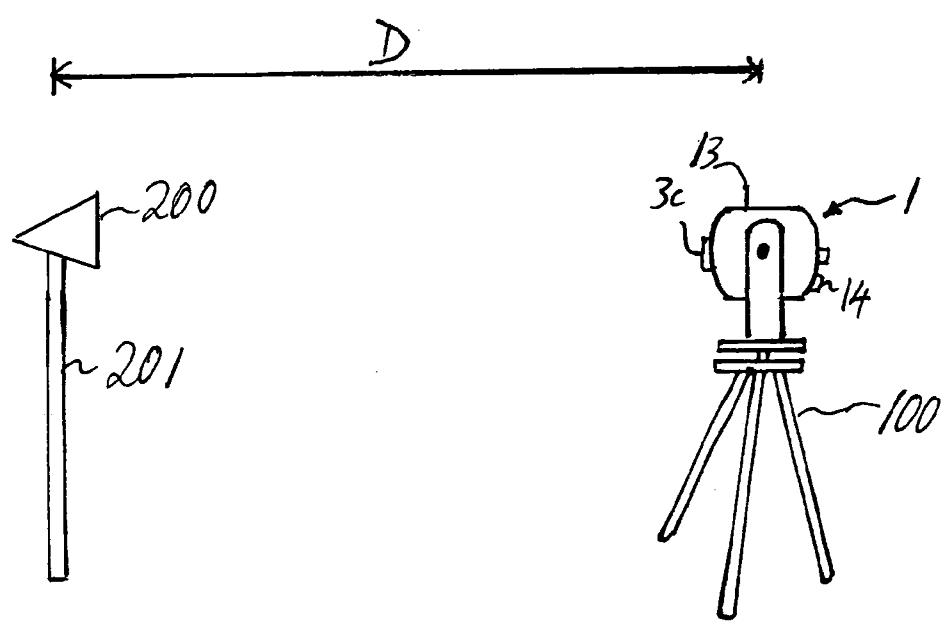
FIG. 6 schematically shows a side view on the surveying instrument of FIG. 5 in an operating state.

Such surveying instrument is frequently mounted on a tripod (as shown in FIG. 6).

The surveying instrument 1 comprises a transmitter unit 2 having the light source 2*a*. The transmitter unit 2 further comprises a light filter 2*c* coupled to a motor 2*b*. By using the motor 2*b*, the light filter 2*c* can be inserted or removed from a beam path defined by the light source 2*a* to adapt the system 1 to use of either a non-cooperative target or a cooperative target. It is emphasized that use of the light filter 2*c* and pertaining motor is only facultative.

The surveying instrument 1 further comprises the measuring optics 3 comprising a central mirror 3*a*, first and second lenses 3*b* and 3*c*, a semi-transparent mirror 3*d* and the optical fiber 3*e* (receiving fiber). However, the present invention is not restricted to measuring optics having such structure.

To measure the distance of the target 200 from the surveying instrument 1, light emitted by the light source 2*a* is projected through the first and second lenses 3*b* and 3*c* towards the target 200 by using the central mirror 3*a*. Light reflected by the target 200 is directed through the second lens 3*c* and the first lens 3*b* towards the semi-transparent mirror 3*d*. Part of the light is reflected by the semi-transparent mirror 3*d* and directed by the backside of the central mirror 3*a* into the optical fiber 3*e*. The position of the central mirror 3*a* can be adjusted by using a support 3*a*' to guarantee that part of the light reflected from the target 200 enters the optical fiber 3*e* of the measuring optics 3. The optical fiber 3*e* of the measuring optics 3 is connected to the receiving unit 15. The semitransparent mirror 3*d* can for example have a wavelength-dependent reflectivity that is especially high for light emitted by the light source 2*a*.

By using direct observation optics 11, the target 200 can be observed by a user through the semitransparent mirror 3*d* and the first and second lenses 3*b*, 3*c* of the measuring optics 3. The direct observation optics 11 is not described in further detail, as it is well known for the skilled person.

Furthermore, the optical fiber 5*a* (reference fiber) and reference optics 5 (here a semitransparent mirror for reflecting part of the light emitted by the light source 2*a*) are provided to directly direct light from the light source 2*a* to the receiving unit 15 without exiting a housing 13 of the system 1. Thus, the optical fiber 5*a* of the reference optics provides an internal reference light to the receiving unit 15. The semitransparent mirror of the reference optics 5 has an inclination of 45° with respect to the direction of propagation of light emitted by the light source 2*a*.

The receiving unit 15 has the structure as explained in further detail in the above first to third embodiments.

A micro-controller 12 is part of the receiving unit and placed on the receiving unit 15. The micro-controller controls operation of both the receiving unit 15 and the transmitter unit 2 (and thus the light source 2*a*). To allow modulation of the radiation emitted by the light source 2*a*, the transmitter unit 2 is connected to the receiving unit 15 by a coaxial cable 10. By determining phase differences between the light emitted by the laser diode 2*a* of the transmitter unit 2 and the light received by the detector 4*a* of the receiving unit 15 the micro-controller 12 either performs calibration of the system (if the light is provided by the reference optics 5) or detects the distance D between the target 200 and the distance measuring system (if the light is reflected by the target 200).

Further, a user interface 14 is connected to the micro-controller 12 for input of a type of measurement to be performed. According to embodiments, this type of measurement includes information whether a cooperative or non-cooperative target is to be used. Alternatively, the surveying instrument can use the micro-controller 12 to automatically detect the kind of target (e.g. by detecting reflectivity of the target).

It is emphasized that the present invention is not restricted to a surveying instrument having the structure described above with respect to FIG. 5. In fact, some or all of the above described elements of the surveying instrument can be omitted or replaced by other elements. Further, additional elements can be provided.

E) Electronic Distance Meter

FIG. 6

An electronic distance meter incorporating the distance-measuring system of the above embodiments is schematically shown in FIG. 6 to give an example for a surveying instrument incorporating the distance-measuring system in an operating condition.

In FIG. 6, the electronic distance meter comprises a housing 13 containing the above-described distance-measuring system 1. The housing 13 is supported by a tripod 100 for allowing alignment of the electronic distance meter to a target 200 by rotating the housing about two perpendicular rotational axes in a known way. The target 200 shown in FIG. 6 is a prism and thus a cooperative target supported by a rod 201.

However, the present invention is not restricted to electronic distance meters or usage of cooperative targets and especially prisms. Even non-cooperative targets can be used.

Further, the present invention can be applied on any instrument and especially surveying instrument.

F) Method of Operating the Surveying Instrument

FIGS. 7A-7C

In the following, embodiments of a method of operating the above surveying instrument are explained by referring to FIGS. 7A to 7C.

Figure 7A:
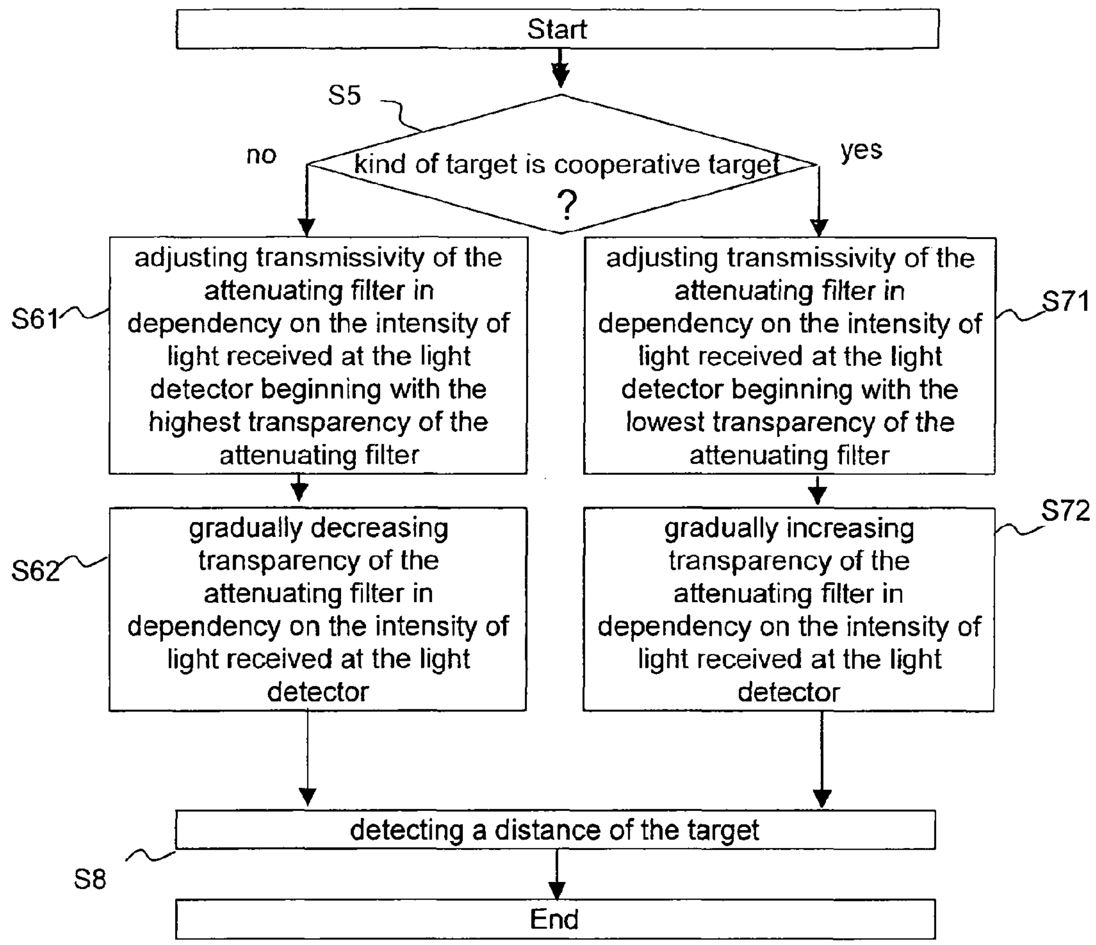
FIG. 7A shows a flow diagram of a method according to an embodiment.

According to a first embodiment shown in FIG. 7A, in a first step S5 it is judged whether the kind of target is a cooperative target having high reflectivity or non-cooperative target having low reflectivity.

If a non-cooperative target is used, transmissivity of the attenuating filter is adjusted in step S61 beginning with the highest transparency of the attenuating filter and thus a low degree of attenuation. The transparency is gradually reduced in step S71 in dependency on the intensity of light received at the light detector.

Alternatively, if a cooperative target is used, transmissivity of the attenuating filter is adjusted in step S62 beginning with the lowest transparency of the attenuating filter and thus a high degree of attenuation. Afterwards, in step S72 the transparency of the attenuating filter is gradually increased in dependency on the intensity of light received at the light detector.

After the attenuating filter has been sufficiently adjusted to the intensity of light received by the light detector, in step S8 a distance of the target is detected before the method is terminated. Afterwards further measurements can be started.

According to a further embodiment, in step S8 a phase difference between the light directed to the target and the reflected light received from the target is detected to calculate the distance of the target.

Figure 7B:
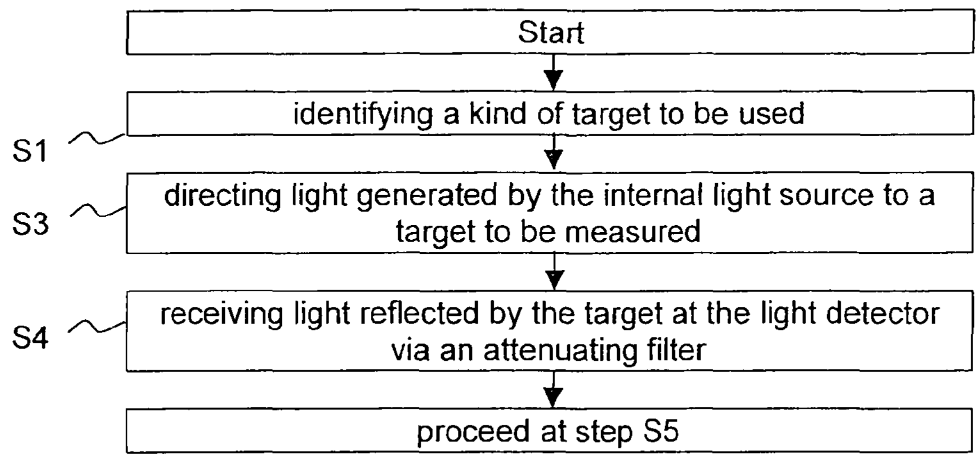
FIG. 7B shows a flow diagram of additional method steps that can be used in the method of FIG. 7A.

According to a further embodiment, the method comprises the additional steps shown in FIG. 7B.

Thus, in the first step S1 a kind of target to be used is identified. The kind of target e.g. comprises a cooperative target and a non-cooperative target. Therefore, in embodiments the decision on the kind of target is already taken in step S1. Alternatively, the decision may only be taken after light reflected from the target is received at the light detector (this will be described later with respect to steps S3 and S4).

Afterwards, in step S3 light generated by an internal light source is directed to the target to be measured. This can be performed e.g. by using the above-described measuring optics.

Light reflected by the target is received nearly instantly in step S4 via an (especially variable) attenuating filter at a light detector e.g. by using the measuring optics before the method proceeds at step S5.

Figure 7C:
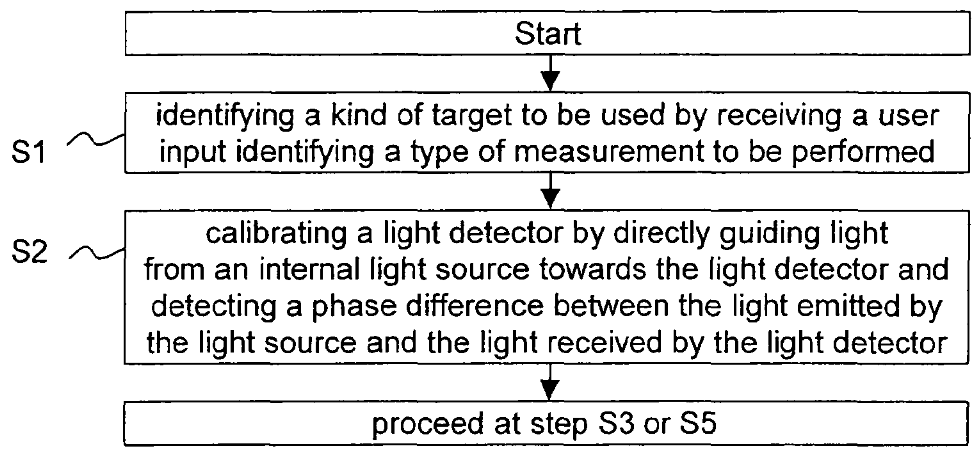
FIG. 7C shows a flow diagram of alternative or additional method steps that can be used in the method of FIG. 7B.

According to a further embodiment, the method comprises the alternative or additional steps shown in FIG. 7C.

Thus, in this embodiment the kind of target is identified in the first step S1 based on a user input identifying a type of measurement to be performed. Thus, this type of measurement comprises information whether a cooperative target or non-cooperative target is to be used.

In a second step S2, the light detector is calibrated by directly guiding light from an internal light source towards the light detector. Thus, the system is brought into the first operating state described above where the optical selector directs internal reference light to the light detector. Afterwards, in the following step S3 the above-described second operating state is entered and the method is resumed as described above. Alternatively, the method can also proceed directly with step S5.

It is an advantage of the proposed system that it has an especially compact structure and can be manufactured at low manufacturing costs while high accuracy is maintained. It is an advantage of the proposed method that a suitable attenuation can be reached especially fast.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes can be made without departing from the spirit and scope of the present invention as defined in the following claims.

What is claimed is:

1. A distance-measuring system, comprising:

a light source;

a light detector;

measuring optics for projecting light emitted by the light source to a target and for guiding light reflected from said target towards the light detector;

reference optics for guiding light emitted by the light source within the system towards the light detector as internal reference light;

a variable attenuator for adjusting intensity of light incident on the light detector, the variable attenuator comprising an attenuating filter arranged in a beam path between the measuring optics and the light detector, and an actuator coupled to the attenuating filter for moving the attenuating filter; and an optical selector for selectively directing light guided by either the measuring optics or the reference optics to the light detector;

wherein the optical selector is coupled to at least one of the actuator or the attenuating filter and moved by the actuator together with the attenuating filter; and wherein the light source is adapted for emitting light to both the measuring optics and the reference optics at the same time.

2. The system according to claim 1, wherein the variable attenuator further comprises a carrier supporting both the attenuating filter and the optical selector; and wherein the actuator is coupled to the carrier for moving the carrier together with the attenuating filter and the optical selector.

3. The system according to claim 1, wherein along the same direction of movement of the attenuating filter caused by the actuator the attenuating filter has first and second sections of varying transmissivity, a first section in which the transmissivity varies from higher transparency to lower transparency and a second section in which the transmissivity varies from higher transparency to lower transparency.

4. The system according to claim 1, wherein an optical axis of the reference optics is offset from an optical axis of the light detector if the selector is not arranged in the optical path of the reference optics; and wherein the optical selector is configured such that it causes parallel displacement of beams entering and leaving the optical selector.

5. The system according to claim 1, wherein the optical selector has first and second mirror surfaces; and wherein the first mirror surface can be arranged in a beam path defined by the reference optics and the second mirror surface can be arranged at the same time in a beam path defined by the light detector.

6. A distance-measuring system, comprising:

a light source;

a light detector;

measuring optics for projecting light emitted by the light source to a target and for guiding light reflected from said target towards the light detector;

reference optics for guiding light emitted by the light source within the system towards the light detector as internal reference light;

a variable attenuator for adjusting intensity of light incident on the light detector, the variable attenuator comprising an attenuating filter arranged in a beam path between the measuring optics and the light detector, and an actuator coupled to the attenuating filter for moving the attenuating filter; and an optical selector for selectively directing light guided by either the measuring optics or the reference optics to the light detector;

wherein the optical selector is coupled to at least one of the actuator or the attenuating filter and moved by the actuator together with the attenuating filter;

wherein the optical selector is a rhomboid prism having first and second mirror surfaces;

wherein the first mirror surface is arranged in a beam path defined by the reference optics and the second mirror surface is arranged at the same time in a beam path defined by the light detector;

wherein the beam path between the first and second mirror surfaces of the optical selector is oriented parallel to a rotational shaft of the carrier; and wherein the light source is adapted for emitting light to both the measuring optics and the reference optics at the same time.

7. The system according to claim 1, further comprising a second light source for emitting an adjustment light guidable through the measuring optics.

8. The system according to claim 7, wherein the optical selector comprises an external reflecting surface for directing the adjustment light towards the measuring optics.

9. The system according to claim 1, further comprising a ball lens arranged adjacent the light detector.

10. The system according to claim 9, wherein the measuring optics comprises an optical fiber and a ball lens arranged adjacent the optical fiber; and wherein the attenuating filter can be arranged between the ball lens of the measuring optics and the ball lens of the light detector.

11. The system according to claim 10, wherein the reference optics comprises an optical fiber coupled to the light source; and wherein the optical selector can be arranged between the optical fiber of the reference optics and the ball lens of the light detector.

12. A distance measuring system, comprising:

a light source;

a light detector comprising a ball lens;

measuring optics for projecting light emitted by the light source to a target and for guiding light reflected from said target towards the light detector, the measuring optics comprising an optical fiber and a ball lens arranged adjacent to the optical fiber;

reference optics for guiding light emitted by the light source within the system towards the light detector as internal reference light, the reference optics comprising a ball lens arranged adjacent an optical fiber, the optical fiber coupled to the light source;

a variable attenuator for adjusting intensity of light incident on the light detector, the variable attenuator comprising an attenuating filter arranged in a beam path between the ball lens of the measuring optics and the ball lens of the light detector, and an actuator coupled to the attenuating filter for moving the attenuating filter; and an optical selector for selectively directing light guided by either the measuring optics or the reference optics to the light detector, the optical selector arranged between the ball lens of the reference optics and the ball lens of the light detector and coupled to at least one of the actuator or the attenuating filter and moved by the actuator together with the attenuating filter; and wherein the light source is adapted for emitting light to both the measuring optics and the reference optics at the same time.

13. The system according to claim 1, further comprising a photo interrupter for detecting presence of a position pin provided at the carrier, the position pin indicating that the optical selector is arranged in the beam path between the reference optics and the light detector.

* * * * *